United States Patent [19]

Pilolla

[11] Patent Number: 5,397,099

[45] Date of Patent: Mar. 14, 1995

[54] SINK ARRANGEMENT WITH FAUCET HAVING DUAL OPERATIONAL MODE

[76] Inventor: Joseph J. Pilolla, 853 Cedar Ave., Elmhurst, Ill. 60126

[21] Appl. No.: 167,734

[22] Filed: Dec. 15, 1993

Related U.S. Application Data

[63] Continuation-in-part of Ser. No. 40,835, Mar. 31, 1993.

[51] Int. Cl.[6] .......................................... F16K 31/11
[52] U.S. Cl. ................................ 251/129.03; 4/623;
 4/639; 251/129.04
[58] Field of Search .................. 251/129.03, 129.04;
 137/801; 4/623, 639, 640

[56] References Cited

U.S. PATENT DOCUMENTS

| | | | |
|---|---|---|---|
| 2,623,545 | 12/1952 | Traynor | 137/720 |
| 2,768,790 | 10/1956 | Frey | 236/12 |
| 2,818,581 | 1/1958 | Miller | 4/640 X |
| 3,726,318 | 4/1973 | Hyde | 137/801 X |
| 4,103,709 | 8/1978 | Fischer | 137/801 X |
| 4,141,383 | 2/1979 | Geimer | 251/129.03 X |
| 4,330,011 | 5/1982 | Moen | 137/625.17 |
| 4,681,141 | 7/1987 | Wang | 251/129.03 X |
| 4,688,277 | 8/1987 | Kakinoki et al. | 4/623 |
| 4,709,728 | 12/1987 | Ying-Chung | 137/636.4 |
| 4,762,273 | 8/1988 | Gregory et al. | 4/623 X |
| 4,889,315 | 12/1989 | Imanaga | 251/129.03 |
| 4,914,833 | 4/1990 | Pilolla et al. | 34/44 |
| 4,915,347 | 4/1990 | Igbal et al. | 137/801 X |
| 4,962,790 | 10/1990 | Chou et al. | 137/599 |
| 5,050,541 | 9/1991 | Shwu-Fen | 137/607 |
| 5,092,560 | 3/1992 | Chen | 251/129.03 X |

*Primary Examiner*—Stephen M. Hepperle
*Attorney, Agent, or Firm*—Dorn, McEachran, Jambor & Keating

[57] ABSTRACT

A faucet for discharging water automatically or manually includes a body which supports a single flow control valve mechanism, a manual actuation mechanism which operates the flow control valve mechanism, and an electrical actuation mechanism which operates the flow control valve mechanism independently of the automatic actuation mechanism. The faucet may be centrally mounted behind two adjacent sink bowls and positionable over each of the bowls to discharge water. Electrical detection means mounted behind one of the bowls detects the presence of a user of that bowl and automatically actuates the faucet in response thereto.

13 Claims, 2 Drawing Sheets

SINK ARRANGEMENT WITH FAUCET HAVING DUAL OPERATIONAL MODE

This application is a continuation-in-part of U.S. patent application Ser. No. 08/040,835, filed Mar. 31, 1993.

BACKGROUND OF THE INVENTION

This invention relates to water faucets and more particularly to an automatically operable faucet having manual capability. Arrangements of this general type are shown in U.S. Pat. Nos. 4,688,277, 4,962,790, 5,050,641 and 5,092,560. Previous faucets providing automatic and manual control capability have required complex valves and operating mechanisms, increasing the cost of manufacture and installation, and often leading to confusion and difficulty in operation.

One drawback of prior designs has been the use of separate selector mechanisms for mode of operation. In such faucets, it is necessary to preselect the mode of faucet operation (manual or automatic). The faucet then operates exclusively in the selected mode until it is manually changed to the other mode. Such an arrangement significantly increases the complexity of use.

Another deficiency of prior designs has been the use of separate flow paths and valving, including the use of pilot valves, for manual and automatic operation. This increased complexity of design results in higher costs of manufacture and installation.

These and other deficiencies are addressed by the faucet of the present invention.

This invention further relates to sink arrangements and more particularly to a sink arrangement employing the automatically and manually operable faucet of the present invention.

In typical household sink arrangements, a manual faucet is centrally mounted behind, and movable between, two sink bowls. Commonly, such an arrangement is used for washing and rinsing dishes. One bowl is filled with water and soap for washing and the other bowl is reserved for rinsing. To rinse a dish, the user generally must choose between two options. On one hand, the faucet may be positioned over the rinsing bowl and manually turned on and off to rinse every washed dish. Repetition of this sequence can become burdensome, adding to the difficulty of the task. Alternatively, the faucet may be positioned over the rinsing bowl and left continually running. Although the user is relieved of the task of turning the faucet on and off for every dish, waste of water results.

The present invention provides a faucet and sink arrangement which eliminates both of these unacceptable alternatives.

SUMMARY OF THE INVENTION

The faucet of the present invention provides automatic and manual control and comprises a body which supports a single flow control valve mechanism, a manual actuation mechanism operatively associated with the flow control valve mechanism to operate the flow control valve mechanism, and an electrically operated automatic actuation mechanism operatively associated with the flow control valve mechanism to operate the flow control valve mechanism independently of the manual actuation mechanism.

The present invention further provides a sink bowl arrangement incorporating the manually and automatically operable faucet. The faucet is centrally mounted behind two adjacent sinks bowls and is positionable over each of the bowls to discharge water. Electrical detection means are mounted behind one of the bowls to detect the presence of a user of that bowl and automatically actuate the faucet in response thereto. In the application of rinsing dishes, the faucet may be positioned over the sink bowl having the detection means to obtain a stream of water which occurs only when a dish is placed in the bowl and which ends as soon as the dish is removed.

DETAILED DESCRIPTION OF THE PREFERRED EMBODIMENTS

Figure 1:
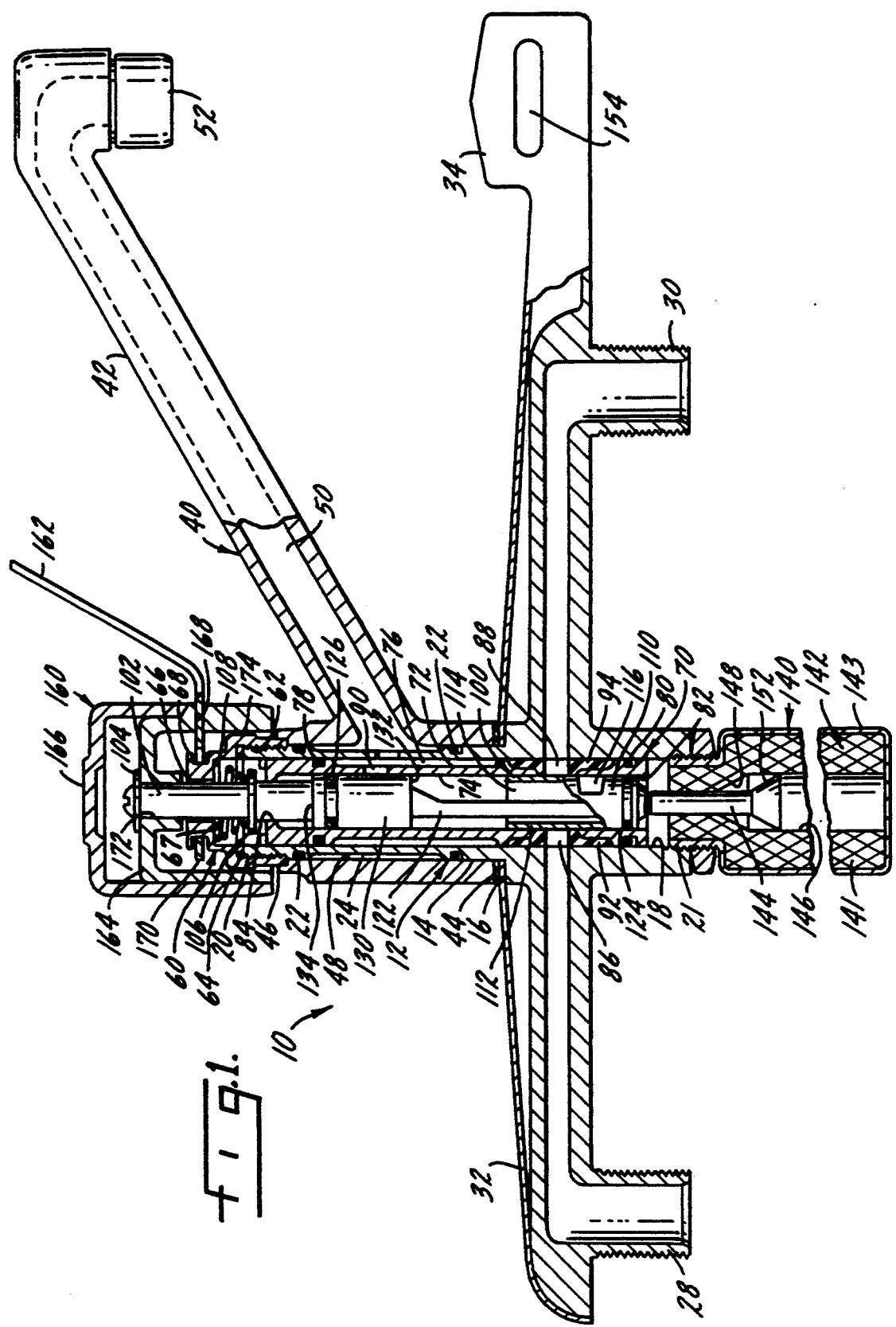
FIG. 1 is a sectional view of a faucet in a closed position which embodies the present invention.

A faucet embodying the principles of the present invention is illustrated in FIG. 1. Designated 10, the faucet body includes base or housing section 12, middle or spout section 40 and top section 60.

Base or housing section 12 is generally cylindrical. It includes an outer cylindrical surface 14 terminating in a shoulder 16. An upper portion of cylindrical surface 14 has threads 20 formed in its outer periphery to permit attachment of top section 60. A bore 18 extends through the center of housing section 12. A lower portion of bore 18 has threads 21 formed therein to permit attachment of an automatic actuation mechanism (as will be more fully explained herein).

Outer cylindrical surface 14 includes spaced grooves in which are disposed elastomeric "O" ring seals 22. An annular relief, or discharge channel, 24 is provided between spaced "O" rings 22. A discharge passage provides communication between housing section bore 18 and discharge channel 24.

Hot and cold water supply conduits 28 and 30 permit attachment of hot and cold water supplies to housing section 12.

A portion of housing section 12 is covered by a decorative shell 32 which conceals conduits 28 and 30. Shell 32 rests upon annular shoulder 16. Shell 32 may include an extended housing portion 34 which houses electronic components associated with automatic operation of the faucet.

Spout section 40 mounts on, and is rotatable relative to, housing section 12. It includes a cylindrical portion and an outwardly extending spout 42. The cylindrical portion rests upon a washer 44 disposed on shell 32 to retain shell 32 upon shoulder 16 of housing section 12.

The upper end of spout section 40 is open, defining an annular shoulder 46. A bore 48 extends through spout section 40 from and defines a surface which surrounds outer cylindrical surface 14 of housing section 12 in sealing engagement with "O" rings 22.

Spout 42 extends outward of spout section 40. It defines a passage or conduit 50 in communication with discharge channel 24. Conduit 50 leads to discharge nozzle 52 from which water exits the faucet during operation.

Top section 60 is generally cylindrical in shape. The lower annular end of top section 60 is seated in annular shoulder 46 of spout section 40, thus retaining spout section 40 in a fixed axial position relative to housing section 12. An enlarged, threaded bore 62 permits attachment of top section 60 over housing section 12 at threads 20. A washer 64 is positioned on the upper annular end of housing section 12 in order to limit the extent to which top section 60 may be screwed onto housing section 12 and insure that spout section 40 remains freely rotatable. A reduced diameter bore 66 extends from a radial undersurface 67 through the upper portion of top section 60. An annular groove 68 is formed in the outer periphery of top section 60 in radial alignment with bore 66.

A flow control and mixing valve, or cartridge mechanism 70 is disposed within housing section bore 18. The cartridge envisioned for the present invention is of the "single lever" type. That is, a single operating lever actuates the valve and permits control of flow and water temperature. One commercially available cartridge mechanism is sold under the trademark "MOEN" by Stanadyne, Inc. of Cleveland, Ohio, a subsidiary of Standard Brands, Inc. Such a cartridge is illustrated in U.S. Pat. No. 4,330,011. Other similar valve mechanisms may be used without departing from the principles of the present invention.

Cartridge mechanism 70 includes a longitudinally elongated sleeve 72 having an internal bore 74. Sleeve 72 is of reduced diameter compared to bore 18 of housing section 12 and defines an annular passage 76 with bore 18. Portions of sleeve 2 adjacent its upper and lower ends are enlarged and mate with bore 18. Grooves formed in these enlarged sleeve portions house "O" ring seals 78 and 80 to provide a water tight seal between housing section 12 and sleeve 72.

Sleeve 72 is open at its lower end 82 and its upper end 84 to permit communication with the upper and lower portions of housing section bore 18. Sleeve 72 includes spaced inlet ports 86 and 88 in communication with, respectively, water supply conduits 28 and 30. Similarly, one or more outlet ports 90 extend through sleeve 72 and provide communication between sleeve bore 74 and annular passage 76.

Resilient seal members 92 and 94 associated with, respectively, inlet ports 86 and 88, are retained between sleeve 72 and housing section 12. Each seal member includes a central aperture which extends through sleeve 72 to define inlet ports 86 and 88.

Postitioned within bore 74 is longitudinally elongate, generally cylindrical, rotatable valve member 100. Valve member 100 includes inlet control piston portion 110 and outlet closure portion 130 connected by hollow tubular member 122. An elongated valve stem 102 extends upwardly from outlet closure portion 130.

Valve stem 102 extends through upper end 84 of sleeve 72 and through top section 60. An annular seat or shoulder 106 extends radially from a mid-portion of stem 102. A helical compression coil spring 108 is disposed between seat 106 and an undersurface 67 of top section 60. An axial key (not shown) is formed in the upper end of stem 102. Stem 102 terminates in a removable screw which defines an enlarged flange 104.

Inlet control piston portion 110 and outlet closure portion 130 define cylindrical surfaces in closely fitting relation to bore 74 of sleeve 72. While this relation is essentially water tight, grooves formed in piston portion 110 and closure portion 130 receive "O" ring seals 124 and 126 to assure containment of the water under pressure within cartridge mechanism 70.

Outlet closure portion 130 extends axially between a bottom edge 132 and a top edge 134. Bottom edge 132 is spaced from inlet control piston portion 110, and top edge 134 is located just above the groove housing "O" ring seal 126.

Piston portion 110 of valve member 100 is comprised of a cylinder 112 defining a hollow internal annular cavity or chamber 114. A notch 116 is formed in cylinder 112 to permit selective communication between chamber 114 and inlet ports 86 and 88.

Valve member 100 is axially movable between an open position and a closed position (closed position illustrated). In the closed position, notch 116 formed in piston portion 110 is disposed below water inlet ports 86 and 88. Bottom edge 132 of outlet closure portion 130 is positioned below water outlet port 90. In the closed position, the outer cylindrical surfaces of piston portion 110 and closure portion 130 block, respectively, inlet ports 86 and 88 and outlet port 90. Water can neither enter nor exit cartridge mechanism 70, effectively shutting off faucet 10.

Upward axial movement of valve member 100 to an open position places notch 116 in communication with inlet ports 86 and 88 and raises bottom edge 132 of outlet closure portion 130 above outlet port 90. Chamber 114 provides communication between inlet ports 86 and 88 and outlet port 90. Water is free to flow through ports 86 and 88 and notch 116 into chamber 114. Water is further free to exit chamber 114 through outlet port 90 into annular passage 76 which, in turn, communicates with nozzle 52 through discharge channel 24 and spout conduit 50.

Notch 116 in piston portion 110 is sized to communicate simultaneously with inlet ports 86 and 88. Valve member 100 is rotatable between extreme positions to permit communication of notch 116 with only inlet port 86 or only inlet port 88 and thus, with only the hot water or only the cold water. Valve member 100 may be selectively rotated intermediate these extreme positions to communicate simultaneously with inlet ports 86 and 88 to provide any blend of hot and cold water desired.

An automatic actuation mechanism in the form of an electrical solenoid 140 is threadedly attached to housing section 12 at lower threads 21. Solenoid 140 includes an annular coil assembly 142 which surrounds an axially elongated, reciprocal metal armature, or core, 144. Coil assembly 142 is comprised of a wire coil 141, wound in the form of a helix, contained within a frame 143. A bore 146 extending through coil assembly 142 receives armature 144 and is in communication with housing section bore 18. A frusto-conical stop surface 148 is defined in the inner periphery of coil assembly 142.

Armature 144 extends out of solenoid bore 146 and into base section bore 18, contacting the lower extent of valve member 100. A frusto-conical stop surface 152 formed on armature 144 is cooperable with stop surface 148 of coil assembly 142 to limit the range of movement of armature 144.

Armature 144 is movable between an unseated position and a seated position in response to magnetic forces exerted by coil assembly 142. In the unseated position, illustrated in FIG. 1, stop surface 152 of armature 144 is spaced from stop surface 148 of coil assembly 142. Armature 144 extends out of solenoid bore 146 a minimum amount. In the seated position, conversely, there is a maximum amount of extension of armature 144 from solenoid bore 146, with armature stop surface 152 abutting, or seating against, coil assembly stop surface 148.

Preferably, solenoid 140 is of the "latching" type. Latching solenoids suitable for use with the present invention are distributed by Liberty Controls Inc. of Shorewood, Ill. In a latching solenoid, permanent magnets are incorporated within the solenoid frame. When the armature is in an unseated position, the field exerted by these magnets has little effect on the armature. Upon application of an initial, or "latching", pulse of power to the coil, a strong magnetic field is produced by the coil which moves the armature from an unseated to a seated position. In the seated position, the permanent magnetic field acts to latch, or hold, the armature in the place without further power being applied to the coil. In a typical solenoid, power must be continuously applied to the coil to hold the armature in the seated position.

The armature remains seated until a pulse of power having a polarity opposite to the polarity of the latching pulse is applied to the coil. When this occurs, a magnetic field is generated by the coil which opposes and cancels the holding effect of the permanent magnetic field. The armature is no longer held in a seated position and is free to be returned to an unseated position.

Solenoid 140 is operated by electronic circuitry which generates pulses appropriate to latch or unlatch the solenoid in response to the presence or absence of a user. The electronic circuitry includes an infra-red emitter and detector mechanism 154 mounted remotely from faucet 10. Infra-red signals are continuously emitted from an emitter portion of mechanism 154, defining a detection zone in which stimuli can be detected. When a stimulus, such as the hands of a user, enters the detection zone, the emitter signals are reflected back and received by a detector portion of mechanism 154. Upon receipt of reflected signals, a latching pulse is generated and applied to coil assembly 142 of solenoid 140, producing a magnetic field which moves armature 144 from an unseated position to a seated position.

As long as a stimulus is present in the detection zone, armature 144 is held in the seated position. When a stimulus is removed from the detection zone, reflections of emitted signals are no longer received by the detector portion. An unlatching pulse is generated and applied to coil assembly 142 of solenoid 140, producing a magnetic field which counteracts the latching field and releases armature 144 from the seated position.

Use of emitting and detecting means remote from or mounted on a faucet to detect a user's presence and energize a solenoid in response is well known. A suitable circuit arrangement is shown in U.S. Pat. No. 4,914,833.

Since armature 144 is in contact with valve member 100, movement of armature 144 to the seated position in response to the presence of a stimulus in the detection zone causes reciprocal upward movement of valve member 100 to its open position. Notch 116 is placed in communication with inlet ports 86 and 88, permitting water to enter annular chamber 114. Bottom edge 132 of outlet closure portion 130 is positioned above outlet port 90. Thus, a flow path is established through cartridge mechanism 70 from the water supply conduits 28 and 30 to the spout discharge nozzle 52.

Movement of valve stem 102 in response to an automatic actuation of faucet 10 compresses helical coil spring 108 between annular seat 106 on stem 102 and undersurface 67 of top section 60. During use of the faucet, the latching magnetic field exerted by coil assembly 142 overcomes the opposing spring force exerted by spring 108. Armature 144 is held in a seated position and valve member 100 is held in an open position, providing uninterrupted water flow. When a stimulus leaves the detection zone, solenoid 140 is unlatched, releasing armature 144 from its held position. The compressed spring now provides a restoring force operative to return valve member 100 to a closed position, and armature 144 to an unseated position, stopping water flow through the faucet.

The manual actuation mechanism takes the form of operating lever 160. Operating lever 160 includes a handle 162, cylindrical collar 164 and removable cap 166. Handle 162 extends through a slot 168 formed in collar 164 and terminates in a semi-circular flange 170 that is disposed in groove 68 formed in top section 60. Thus, operating lever 160 may oscillate about the vertical axis of the faucet and also pivot vertically. The operative elements of lever 160—handle 162, collar 164 and cap 166—are fixed for rotational and vertical movement.

Passage 172 formed through the top of collar 164 receives the upper end of stem 102. An axial keyway (not shown) formed in a sidewall of passage 172 receives the axial key formed in stem 102. In this manner, valve member 100 and operating lever 160 are fixed for rotational movement. Enlarged flange 104 of stem 102 rests on the upper surfaces of collar 164 surrounding passage 172.

Cap 166 is a decorative piece and is snap-fitted above collar 164. It is removable to permit access to the internal elements of the faucet.

Manual operation of the faucet is accomplished with operating lever 160. Vertical pivotal movement controls flow. Oscillation about the vertical axis controls water temperature.

Horizontal rotation of handle 162 causes flange 170 of handle 162 to slide within groove 68 in top section 60, permitting operating lever 160 to rotate about the faucet's vertical axis. The connection between the key formed in stem 102 and the keyway formed in passage 170 of collar 164 imparts the rotational movement to stem 102 and valve member 100. Such rotation orients notch 116 relative to the hot and cold water inlet ports 86 and 88 to provide proportional mixing of the separate water supplies. The temperature of the water which exits nozzle 52 is set by the user in this manner. Appropriate stops are provided which limit the range of rotational movement of operating lever 160.

Flow control by manual actuation is accomplished through vertical pivotal movement of operating lever 160. Such movement is accomplished by fulcrum action of handle flange 170 within groove 68. Upward movement of handle 162 causes corresponding upward movement of collar 164. This movement is transferred to stem 102 by flange 104. This lifting linkage is effective to move valve member 100 toward an open position. It should be noted that in manual actuation, valve member 100 moves independently of armature 144, which remains in an unseated position.

In a fully open position, notch 116 is aligned, and in communication, with inlet ports 86 and 88. Bottom edge 132 of outlet closure portion 130 is positioned above outlet port 90, permitting maximum flow to spout conduit 50. Using the manual actuation mechanism, selective axial positioning of valve member 100 between fully closed and fully open positions controls the volume of water discharged from nozzle 52. Intermediate axial positioning exposes more or less of inlet ports 86 and 88 to notch 116, and also changes the open area of outlet port 90.

During manual operation, solenoid 140 remains unlatched. There is no magnetic force to counteract the force exerted by spring 108 and consequently, valve member 100 is forced to a closed position almost immediately upon release of handle 162 by the user. Such an arrangement is advantageous in that conservation of water is maximized. Inconvenience may result, however, since the faucet shuts off virtually immediately upon release of handle 162. Several optional modifications of faucet 10 are envisioned and discussed below that permit uninterrupted water flow during manual faucet operation until handle 162 is manually lowered by the user.

A friction pad 174 may be mounted on the outer periphery of top section 60 to engage the inner periphery of collar 164 below handle 162. The interactive frictional engagement between pad 174 and collar 164 should exceed the spring force exerted by spring 108. Thus, in the manual mode of operation, friction pad 174 secures operating lever 160 and consequently, valve member 100, in a raised, or open, position until handle 162 is manually lowered. Lowering handle 162 moves collar 164 away from stem flange 104, which permits spring 108 to move valve member 100 toward a closed position.

Alternately, armature 144 of solenoid 140 could be permanently attached to valve member 100, fixing the two members for axial movement during both manual and automatic operation. When operating lever 160 is manually raised a sufficient amount, valve member 100 is pulled up to an open position and armature 144 is pulled up to a seated position. In this position, solenoid 140 becomes latched and valve member 100 is held in an open position until downward force sufficient to overcome the magnetic latching field is exerted on handle 162. It is again noted that application of power to solenoid coil assembly 142 is not required to maintain this magnetic field. The feasability of this option is dependent on the strength of the magnetic field exerted by the permanent magnets in solenoid 140. It must be strong enough to overcome downward pressure exerted by spring 108, yet weak enough so that a user of ordinary strength may overcome the field with a downward push on handle 162 without an unusual amount of effort.

There is, in essence, a lost motion relationship between operating lever 160 and valve member 100. This relationship isolates the manual actuation components from the flow control valve during automatic actuation. In manual operation, upward force is imparted to valve member 100 through stem 102 and the relationship of enlarged flange 104 with collar 164. In automatic operation, the magnetic flux field of solenoid 140 causes upward movement of armature 144 until it reaches a seated position. Such movement translates into upward movement of valve member 100 and stem 102 without disturbing collar 164. Valve member 100 is lifted independently of collar 164 and consequently, independently of the manual actuation mechanism.

An important result of this lost motion relation is that operating lever 160 remains stationary during automatic actuation. A sudden, upward movement of handle 162 does not occur. Furthermore, the use of a friction pad as described above will not impede automatic actuation of the faucet.

Figure 2:
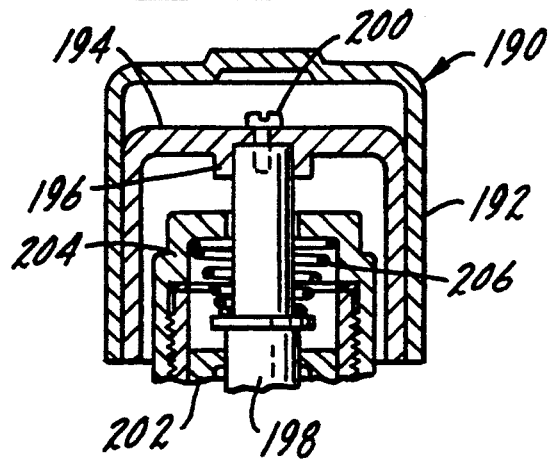
FIG. 2 is a partial sectional view of a second embodiment of the present invention.

Illustrated in FIG. 2 is an alternate manual actuation mechanism. This arrangement utilizes a vertically moveable and rotatable operating knob 190, rather than a lever-type arrangement as in the first embodiment. Operating knob 190 includes a cap 192 snap-fitted over a cylindrical collar 194.

An annular receptacle 196 formed underneath the top surface of collar 194 receives the top portion of valve member stem 198. Screw 200 extending through collar 194 and into valve member stem 198 fixes operating knob 190 and the faucet valve member for vertical and rotational movement.

The remaining faucet components are essentially identical to those of the first embodiment faucet 10. Valve member stem 198 extends through the top of cartridge sleeve 202 and passes through faucet top section 204. Spring 206 mounted inside top section 204 urges the valve member towards a closed position. Note that annular groove 68 formed in top section 60 of the first embodiment may be omitted in this embodiment.

Manual control of water flow is accomplished by vertical displacement of, or pulling up on, knob 190. This differs from a lever arrangement in that a pulling motion, rather than a pivotal motion, is utilized. Oscillation of knob 190 about the vertical axis controls water temperature.

The primary substantive difference between operating knob 190 and operating lever 160 is that the lost motion relationship between the valve member and manual actuation mechanism is eliminated. Knob 190 and valve member stem 198 are locked together by virtue of screw 200. Thus, movement of the valve member caused by automatic faucet operation will be accompanied by movement of knob 190. Sudden movement of the manual actuation mechanism is not a great concern, however, as the outwardly-extending handle has been eliminated.

Figure 3:
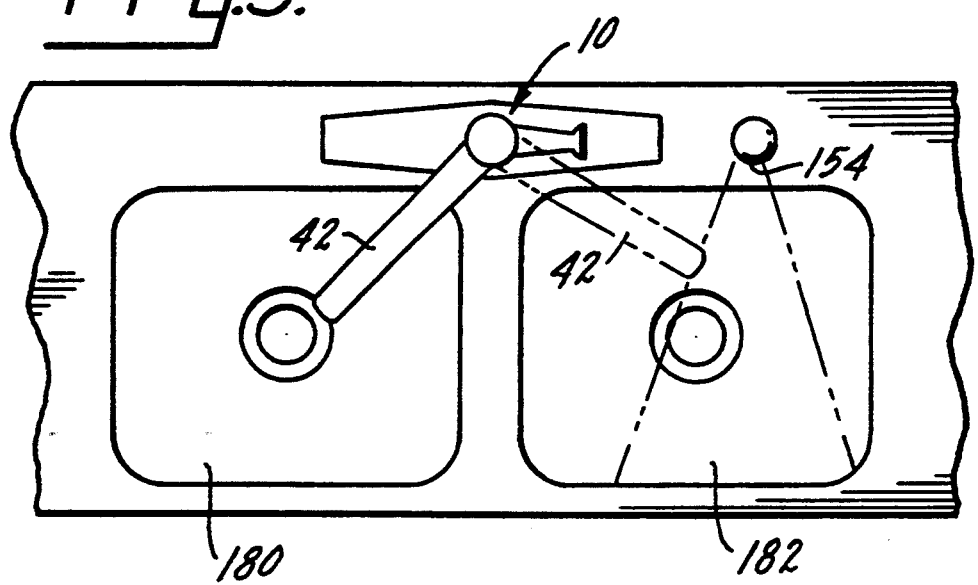
FIG. 3 is a top view of a sink bowl arrangement which embodies the present invention.
Figure 4:
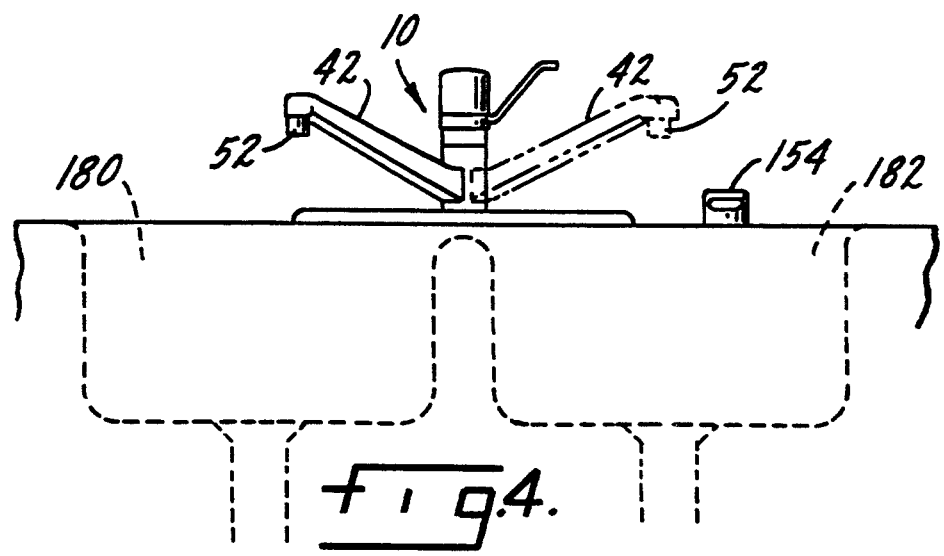
FIG. 4 is a partial sectional view of the sink bowl arrangement illustrated in FIG. 3.

Turning now to FIGS. 3 and 4, there is illustrated a sink bowl arrangement embodying another aspect of the present invention. Faucet 10 is centrally mounted behind two sink bowls 180 and 182 for receiving, holding and draining water. Spout 42 is rotatable so that discharge nozzle 52 is positionable over either of the two bowls. Emitter and detector mechanism 154 is positioned behind one of the two bowls (depicted in FIGS. 3 and 4 as bowl 182) to create a detection zone over that bowl. As FIGS. 3 and 4 make apparent, mechanism 154 is not necessarily contained within an extension of shell 32, as is depicted in FIG. 1. Faucet 10 is automatically actuated only when a stimulus, such as the hands of a user, penetrates the detection zone over bowl 182. A stimulus in bowl 180 does not actuate the faucet.

This arrangement is particularly useful for the household application of manually washing and rinsing dishes. For example, nozzle 52 may be first positioned over bowl 180 so that it may be filled with water (and detergent) and used as the "washing" bowl. After bowl 180 is filled, nozzle 52 is repositioned over bowl 182, the "rinsing" bowl. When a dish has been washed in bowl 180, the user may simply position the dish in the detection zone over bowl 182. Mechanism 154 will detect the stimulus and actuate the faucet. When finished rinsing, removal of the dish causes automatic deactivation of the faucet, as mechanism 154 no longer detects a stimulus. Note that the presence of a user's hands in bowl 180 while washing dishes does not actuate the faucet, regardless of which bowl the nozzle is positioned over, as bowl 180 is not within the detection zone of emitter and detector mechanism 154.

This arrangement relieves the user of having to choose between two undesirable, but generally necessary, methods of rinsing dishes: (1) manually turning the faucet on and off every time a dish is rinsed; or (2) keeping the faucet in a constant open position, resulting in great waste of water. Dishes may be rinsed efficiently and without waste of water.

Various features of the present invention have been explained with reference to the embodiments shown and described. It must be understood, however, that modification may be made without departing from the spirit and scope of the invention.

I claim:

1. A faucet for discharging water automatically and manually comprising:
   a housing section having at least one water inlet port and at least one water outlet port, said housing section supporting a single flow control valve mechanism movable between an open position wherein said valve mechanism establishes a flow path between said inlet and outlet ports, and a closed position wherein said valve mechanism blocks said flow path between said inlet and outlet ports;
   a discharge spout in communication with said housing section outlet ports;
   a top section mounted above said housing section and including biasing means operatively connected to said valve mechanism to move said valve mechanism toward said closed position;
   a manual actuation mechanism mounted above said top section and operatively associated with said valve mechanism to operate said valve mechanism, said manual actuation mechanism comprising a handle pivotally connected to said top section, and a collar operatively associated with said handle and said valve mechanism such that said valve mechanism is movable relative to said collar during automatic actuation and is movable with said collar during manual actuation; and
   an electrically operated automatic actuation mechanism mounted below said housing section and operatively associated with said valve mechanism to operate said valve mechanism independently of said manual actuation mechanism.

2. A faucet as recited in claim 1 wherein said automatic actuation mechanism includes a solenoid comprising a coil assembly adapted to be energized in response to the presence of a user, and an armature operatively associated with said valve mechanism to move said valve mechanism to said open position upon energization of said coil 3. A faucet as recited in claim 2 wherein said solenoid is a latching solenoid.

4. A faucet as recited in claim 1 wherein said manual actuation mechanism comprises a knob operatively associated with said valve member such that said valve mechanism is movable with said knob during both manual and automatic actuation.

5. A sink bowl arrangement comprising:
   two adjacent sink bowls for receiving, holding and draining water;
   a faucet for discharging water automatically or manually positionable over each of said bowls to discharge water, said faucet comprising a body supporting a single flow control valve mechanism, a manual actuation mechanism operatively associated with said flow control valve mechanism to operate said flow control valve mechanism, and an electrically operated automatic actuation mechanism operatively associated with said flow control valve mechanism to operate said flow control valve mechanism independently of said manual actuation mechanism; and
   detection means positioned relative to said sink bowls to create a detection zone over only one of said bowls, said detection means operable to energize said automatic actuation mechanism upon penetration of said detection zone by a stimulus.

6. A sink bowl arrangement as claimed in claim 6 wherein said flow control mechanism includes a sleeve in said body defining at least one inlet port and one outlet port, and a valve member within said sleeve movable between a closed position in which said valve member separates said inlet port from said outlet port and at least one open position in which said inlet port and said outlet port are in fluid communication, said automatic actuation mechanism being connected to said valve member and operable to move said valve member between said closed position and an open position, said manual actuation mechanism being connected to said valve member and operable to move said valve member from said closed position toward said open position.

7. A sink bowl arrangement as claimed in claim 6 wherein said automatic actuation mechanism comprises a solenoid mounted underneath said body including a coil adapted to be energized in response to signals received from said emitter and detector mechanism, and a reciprocal armature connected to said valve member and effective to move said valve member to an open position on energization of said coil.

8. A sink bowl arrangement faucet as recited in claim 7 wherein said solenoid is a latching solenoid.

9. A sink bowl arrangement comprising:
   two adjacent sink bowls for receiving, holding and draining water;
   a manually and automatically actuatable faucet positionable over each of said bowls to discharge water; and
   detection means positioned relative to said sink bowls to create a detection zone over only one of said bowls, said bowls to discharge water; and detection means operable to energize said automatic actuation mechanism only upon penetration of said detection zone by a stimulus.

10. A faucet as claimed in claim 1, and further comprising anti-biasing means operable to retain said valve mechanism in said open position during manual actuation of said faucet.

11. A faucet as claimed in claim 10, wherein said anti-biasing means comprises a pad secured to said top section and being frictionally engaged with said collar.

12. A faucet as claimed in claim 1, wherein said biasing means comprises a compression spring seated between a first seating surface formed in said top section and a second seating surface formed on said valve mechanism.

13. A faucet as claimed in claim 2, wherein said valve mechanism is movable relative to said armature during manual actuation, and is movable with said armature during automatic actuation.

* * * * *